US009135506B2

(12) United States Patent (10) Patent No.: US 9,135,506 B2
Chen et al. (45) Date of Patent: Sep. 15, 2015

(54) METHOD AND APPARATUS FOR OBJECT DETECTION

(71) Applicant: CANON KABUSHIKI KAISHA, Tokyo (JP)

(72) Inventors: Zeng Chen, Beijing (CN); Lifeng Xu, Beijing (CN); Fuguo Zhu, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 14/058,115

(22) Filed: Oct. 18, 2013

(65) Prior Publication Data

US 2014/0112535 A1 Apr. 24, 2014

(30) Foreign Application Priority Data

Oct. 19, 2012 (CN) .......................... 2012 1 0398301

(51) Int. Cl.
*G06K 9/00* (2006.01)
*H04N 5/225* (2006.01)
(52) U.S. Cl.
CPC ........ *G06K 9/00604* (2013.01); *G06K 9/00382* (2013.01)
(58) Field of Classification Search
CPC .................................. G06K 9/00; H04N 1/00
USPC .......... 382/103, 107, 236; 348/154, 155, 169, 348/170, 171, 172, 352
See application file for complete search history.

(56) References Cited

U.S. PATENT DOCUMENTS

| 5,771,307 | A  | * | 6/1998  | Lu et al. ........................ | 382/116 |
| 7,197,166 | B2 |   | 3/2007  | Jeng                              |         |
| 2009/0244614 | A1 | * | 10/2009 | Matsuhira .................... | 358/1.15 |

OTHER PUBLICATIONS

Daugman, John G., "High Confidence Visual Recognition of Persons by a Test of Statistical Independence", IEEE Transactions on Pattern Analysis and Machine Intelligence, Nov. 1993, pp. 1148-1161, vol. 15, No. 11.
Wildes, Richard P., "Iris Recognition: An Emerging Biometric Technology", Proceedings of the IEEE, Sep. 1997, pp. 1348-1363, vol. 85, No. 9.

* cited by examiner

*Primary Examiner* — Abolfazl Tabatabai
(74) *Attorney, Agent, or Firm* — Canon USA Inc. IP Division

(57) ABSTRACT

A method for detecting a plurality of object regions in an image, wherein the plurality of object regions having similar specific structural features, comprises: an estimation step for estimating a common initial value for the specific structural features of the plurality of object regions; and a determination step for determining, for each of the plurality of object regions, a final value for the specific structural feature of the object region and a final position thereof separately based on the estimated common initial value.

29 Claims, 18 Drawing Sheets

 
FIG. 8A  FIG. 8B
 
(a) (b)
FIG. 9

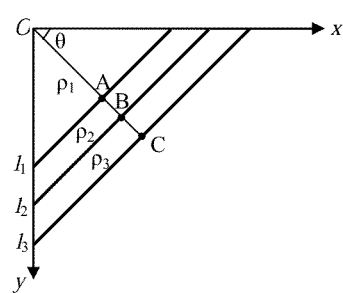
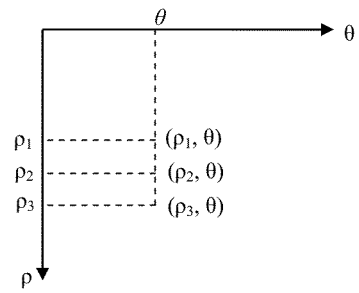
FIG. 16A          FIG. 16B
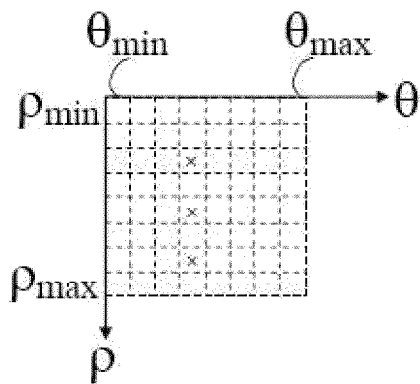
FIG. 17

METHOD AND APPARATUS FOR OBJECT DETECTION

CROSS-REFERENCE TO RELATED APPLICATIONS

This application claims the benefit of Chinese Patent Application No.: 201210398301.5 filed Oct. 19, 2012, which is hereby incorporated by reference herein in its entirety.

BACKGROUND OF THE INVENTION

1. Field of the Invention

The present invention relates to method and apparatus for object detection in an image. More specifically, the present invention relates to method and apparatus for detecting a plurality of object regions with similar specific structural features in an image.

2. Description of the Related Art

In recent years, object detection is popularly applied in the field of image processing, computer vision and pattern recognition and plays an important role therein. A common kind of object detection is detection for objects with similar and even the same features in an image, such as human pupils, etc, and there exists many type of techniques for such object detection.

Hereinafter, we would take pupil detection in a face image as an example to explain the current techniques for detecting a plurality of objects with similar and even the same features in an image in the prior art.

For pupil detection, since the pupil center is similar to the iris center and the shape of eye iris is approximately circular, the iris boundary is actually detected and used to estimate the pupil center. The best known and thoroughly examined algorithm is perhaps the algorithm based on the work described in J. Daugman, "High Confidence Visual Recognition of Persons by a Test of Statistical Independence", PAMI, 1993 (hereinafter to be referred as Daugman). The technique uses an integro-differential operator to find the circular boundary of an iris. Another well-known algorithm is based on the circular Hough transform employed by R. Wildes, "Iris Recognition: An Emerging Biometric Technology", Proc. IEEE, 1997.

However, the general methods mainly try their best to precisely localize the pupil center in a single eye image, that is, separately determine respective pupil centers in respective eyes, and do not pay much attention on the relation between the left eye and the right eye in a face image. Therefore, the results gotten by the general methods show the difference of the radius sizes of two pupils is very large, as shown in FIG. 13A.

Furthermore, another shortcoming in the general methods is that, when the uncertainty (e.g. uneven light) of photo environment and the local circular-like dark areas of surrounding objects (e.g. eyebrows, eyeglasses, and hair) appear in the image, the detection result of the general methods becomes unreliable.

U.S. Pat. No. 7,197,166 discloses an iris extraction method capable of precisely determining positions and sizes of irises in a digital face image. The method uses the relation between the left eye and the right eye in the face image to localize the iris, and as shown in FIG. 2 which shows the key flow chart of the method, the method comprises the following steps: roughly detecting the positions of two eyes in a face image, and measuring the distance between the two positions; defining two rectangular searching regions according to the distance (the scales of the two rectangles are related to the distance); and precisely localizing an iris for each of rectangular searching regions separately. Although the method employs the distance between the positions of two eyes to determine the rectangular searching regions of irises or pupils, the method does not consider the similar features (e.g. the same radius) of two irises. This might result in inaccuracy of the final iris location.

As describe above, there still needs a method capable of accurately detecting a plurality of object regions with similar features in an image.

SUMMARY OF THE INVENTION

The present invention is developed with respect to detection of a plurality of object regions with similar features in an image, and aims to solve the problems as described above.

According to one prospect of the present invention, there provides a method for detecting a plurality of object regions in an image, the plurality of object regions having similar specific structural features, the method comprises estimation step for estimating a common initial value for the specific structural features of the plurality of object regions; and determination step for determining, for each of the plurality of object regions, a final value for the specific structural feature of the object region and a final position thereof separately based on the estimated common initial value.

According to another prospect of the present invention, there provides an apparatus for detecting a plurality of object regions in an image, the plurality of object regions having similar specific structural features, the apparatus comprises estimation unit configured to estimate a common initial value for the specific structural features of the plurality of object regions; and determination unit configured to determine, for each of the plurality of object regions, a final value for the specific structural feature of the object region and a final position thereof separately based on the estimated common initial value.

According to still another prospect of the present invention, there provides a method for detecting two eye pupil regions in a face image, the two eye pupil regions having similar radii, the method comprises estimation step for estimating a common initial value for the radii of the two eye pupil regions; and determination step for determining, for each of the two eye pupil regions, a final value for the radius of the eye pupil region and a final center of the eye pupil region separately based on the estimated common initial value.

According to yet another prospect of the present invention, there provides an apparatus for detecting two eye pupil regions in a face image, the two eye pupil regions having similar radii, the apparatus comprises estimation unit configured to estimate a common initial value for the radii of the two eye pupil regions; and determination unit configured to determine, for each of the two eye pupil regions, a final value for the radius of the eye pupil region and a final center of the eye pupil region separately based on the estimated common initial value.

Advantageous Effect

The solutions proposed in the present invention employ the similar specific structural features among a plurality of areas of an object category, that is, a plurality of object regions, to precisely determine the locations of the plurality of areas. More specifically, the solutions proposed in the present invention detect the plurality of areas of the object category by considering the similarity among the plurality of areas of the object category and considering the actual location of each of the plurality of areas of the object category in the image separately, and thus can simply solve the problems of general methods and achieve accurate object detection so as to precisely determine the position and specific structural feature for each of the plurality of areas of the object category in the image.

Further characteristic features and advantages of the present invention will be apparent from the following description with reference to the drawings.

BRIEF DESCRIPTION OF THE DRAWINGS

The accompanying drawings, which are incorporated in and constitute a part of the specification, illustrate embodiments of the invention and, together with the description, serve to explain the principles of the invention. In the figures, similar reference numerals are used for denoting similar items.

FIG. 5A to 5D illustrate the process of the detecting method in Example 1, wherein FIG. 5A is a schematic view of two eye pupil regions in an input image, FIG. 5B schematically illustrates the estimation process with respect to the two eye pupil regions, FIG. 5C schematically illustrates the determination process with respect to the two eye pupil regions, and FIG. 5D schematically illustrates the detection result of Example 1.

FIGS. 8A and 8B schematically illustrate specular reflection correction.

FIG. 9 schematically illustrates partial region pre-processing for the object regions.

FIGS. 16A and 16B illustrate mapping of parallel lines to Hough space.

FIG. 17 illustrates the division of accumulator units for parameter $\rho\theta$ in Hough transform.

Description of the Embodiments

Figure 1:
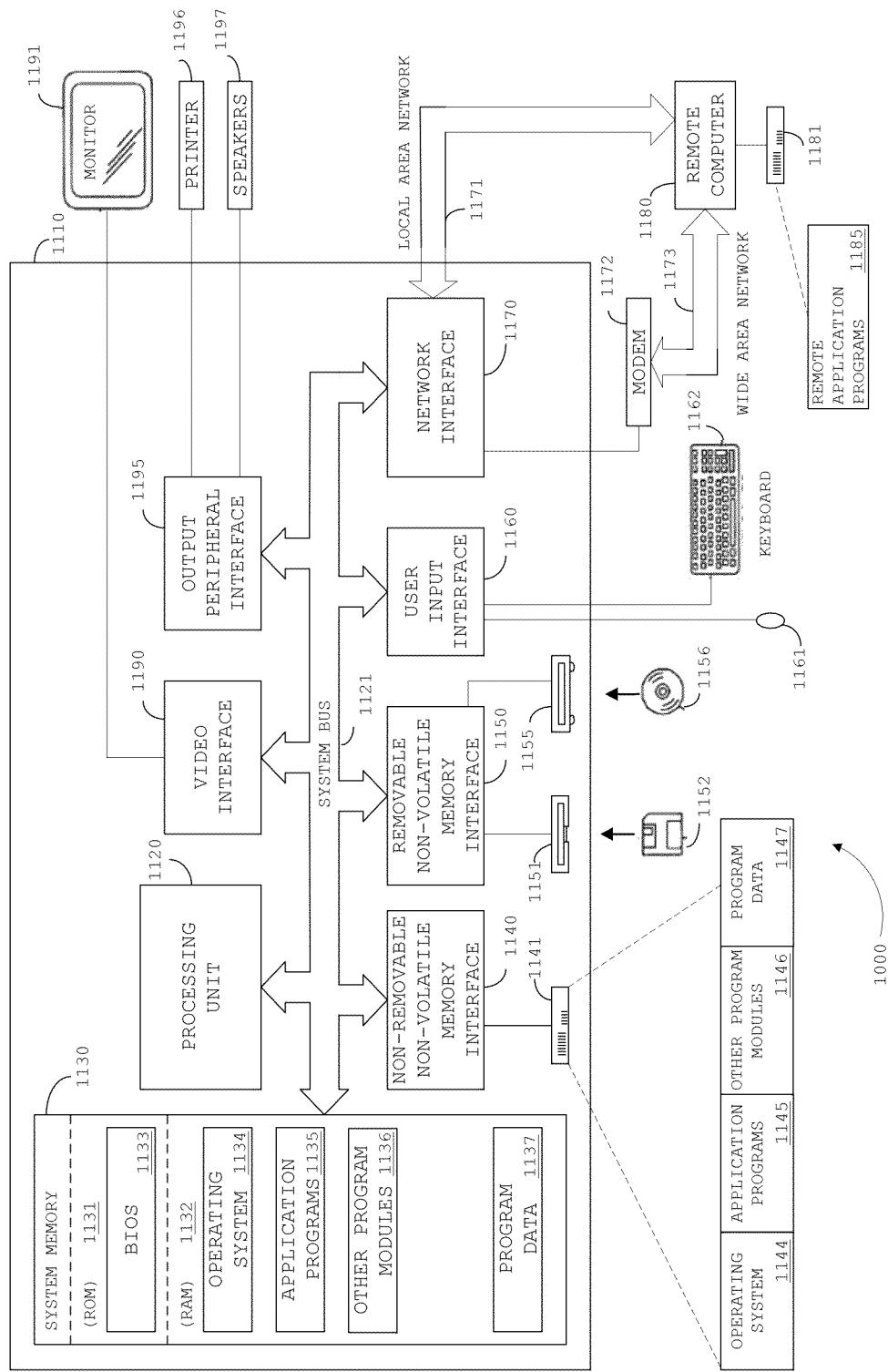
FIG. 1 is a block diagram showing an exemplary hardware configuration of a computer system which can implement the embodiments of the present invention.
Figure 2:
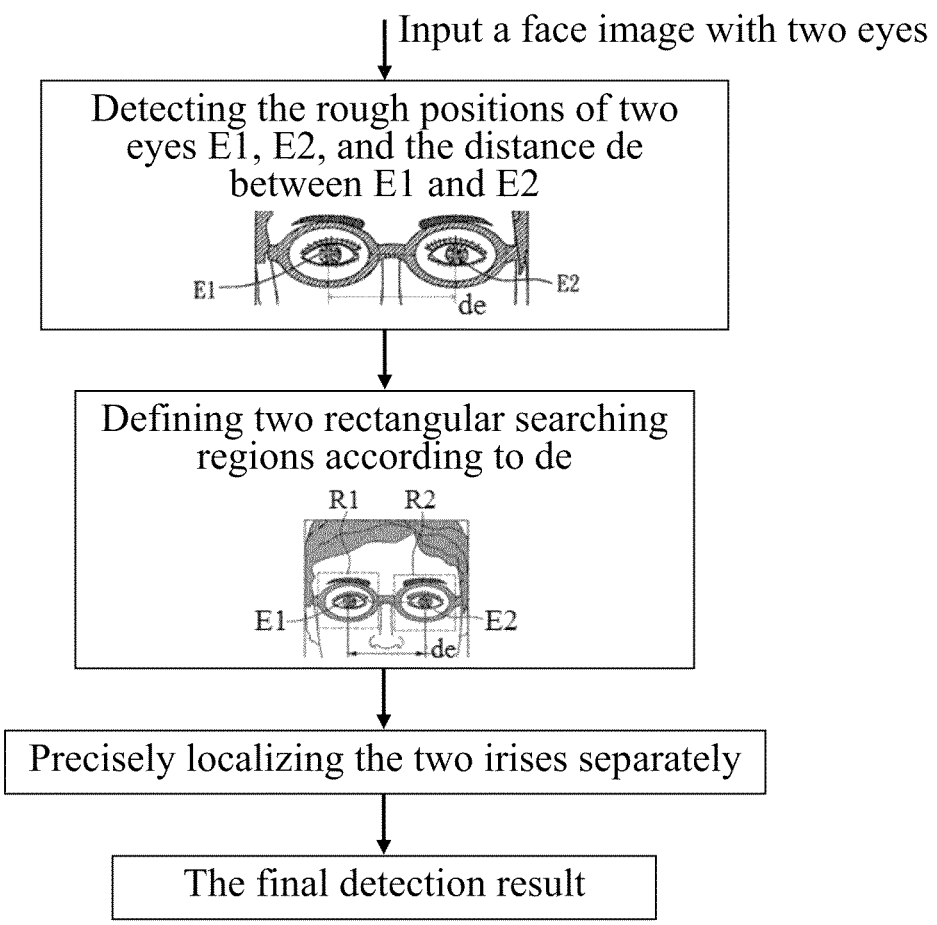
FIG. 2 is a diagram explaining a method disclosed by the prior art.

Embodiments of the present invention will be described in detail below with reference to the drawings.

Please note that similar reference numerals and letters refer to similar items in the figures, and thus once an item is defined in one figure, it need not be discussed for following figures.

First of all, meanings of some terms in context of the present disclosure will be explained.

In the context of the present specification, an image may refer to many kinds of images, such as color image, grey image, etc. Since the process of the present invention is mainly performed on a grey image, hereinafter, the image in the specification would refer to a grey image including a plurality of pixels, unless otherwise stated.

Please note that the process of the present invention also can be applied to other kinds of image, such as color image, as long as such image could be converted to a grey image, and the process of the present invention would be performed on the converted grey image.

In the present disclosure, the terms "first", "second" and the like are only used to discriminate between elements or steps, but are not intended to indicate a temporal order, a preference or an importance.

An object region in an image corresponds to an area in a plurality of areas of an object category. The plurality of areas of the object category usually are two or more areas of the object category and have the similar features, particularly, structural features, and thus the object regions in an image also have similar structure features thereamong.

The detection of an object region may correspond to the detection of the structural feature and position of the object region, and particularly, a specific structural feature of the object region as well as position corresponding to the specific structure feature of the object region.

Structural features of an object region usually are features representing the characteristic of such object region, such as, shape of the object region, etc, and usually can be expressed by many kinds of parameters depending on the object category. Among others, a specific structural feature of an object region is a most representative structural feature showing the characteristic of the object region, and usually is a specific parameter depending on the object category. For example, when the object region is a circular and quasi-circular shaped region, such as human pupil, eyeglass, etc, in the image, the specific structural feature may be the radius of the object region, when the object is a rectangular or line shaped region, the specific structural feature may be the width or length of the object region.

The position of an object region corresponding to the detected specific structural feature usually may be a position in the object region at which the detected specific structural feature is positioned and may be a specific position in the object region depending on the shape of the object region. For example, when the object region is a circular or quasi-circular shaped region in the image, the position of the object region to be detected usually is the circular center of the object region, and when the object region is a rectangular or line shaped region, the position thereof to be detected may be the end points of its width or length, or the center point in the direction of its width or length of such rectangular or line shaped region.

FIG. 1 is a block diagram showing a hardware configuration of a computer system 1000 which can implement the embodiments of the present invention.

As shown in FIG. 1, the computer system comprises a computer 1110. The computer 1110 comprises a processing unit 1120, a system memory 1130, non-removable non-volatile memory interface 1140, removable non-volatile memory interface 1150, user input interface 1160, network interface 1170, video interface 1190 and output peripheral interface 1195, which are connected via a system bus 1121.

The system memory 1130 comprises ROM (read-only memory) 1131 and RAM (random access memory) 1132. A BIOS (basic input output system) 1133 resides in the ROM 1131. An operating system 1134, application programs 1135, other program modules 1136 and some program data 1137 reside in the RAM 1132.

A non-removable non-volatile memory 1141, such as a hard disk, is connected to the non-removable non-volatile memory interface 1140. The non-removable non-volatile memory 1141 can store an operating system 1144, application programs 1145, other program modules 1146 and some program data 1147, for example.

Removable non-volatile memories, such as a floppy drive 1151 and a CD-ROM drive 1155, are connected to the removable non-volatile memory interface 1150. For example, a floppy disk 1152 can be inserted into the floppy drive 1151, and a CD (compact disk) 1156 can be inserted into the CD-ROM drive 1155.

Input devices, such a mouse 1161 and a keyboard 1162, are connected to the user input interface 1160.

The computer 1110 can be connected to a remote computer 1180 by the network interface 1170. For example, the network interface 1170 can be connected to the remote computer 1180 via a local area network 1171. Alternatively, the network interface 1170 can be connected to a modem (modulator-demodulator) 1172, and the modem 1172 is connected to the remote computer 1180 via a wide area network 1173.

The remote computer 1180 may comprise a memory 1181, such as a hard disk, which stores remote application programs 1185.

The video interface 1190 is connected to a monitor 1191.

The output peripheral interface 1195 is connected to a printer 1196 and speakers 1197.

The computer system shown in FIG. 1 is merely illustrative and is in no way intended to limit the invention, its application, or uses.

The computer system shown in FIG. 1 may be implemented to any of the embodiments, either as a stand-alone computer, or as a processing system in an apparatus, possibly with one or more unnecessary components removed or with one or more additional components added.

Basic Embodiment

Figure 3A:
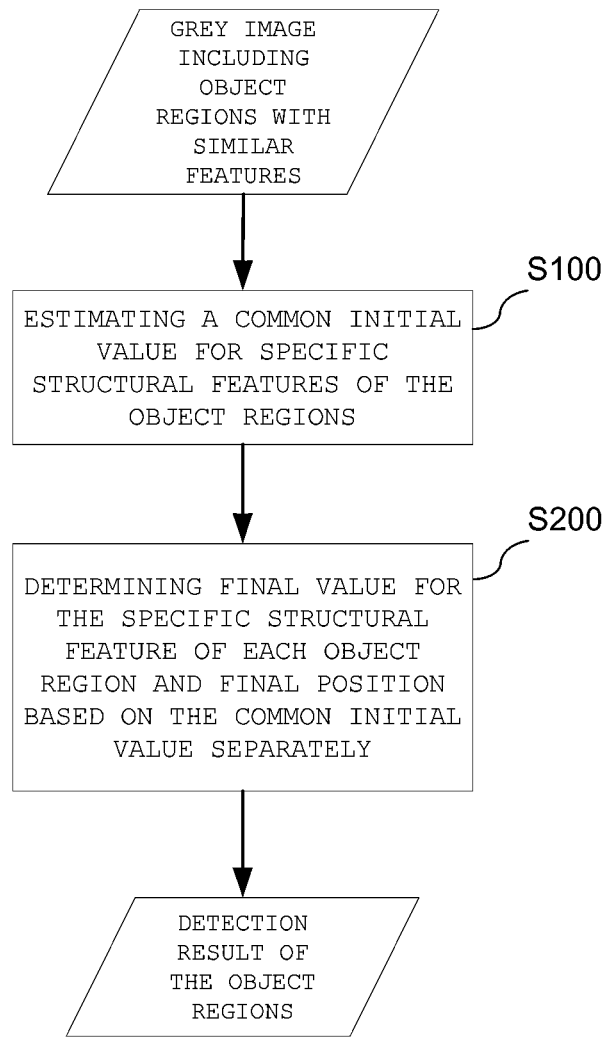
FIG. 3A is a flow chart illustrating the method according to the basic embodiment of the present invention.
Figure 3B:
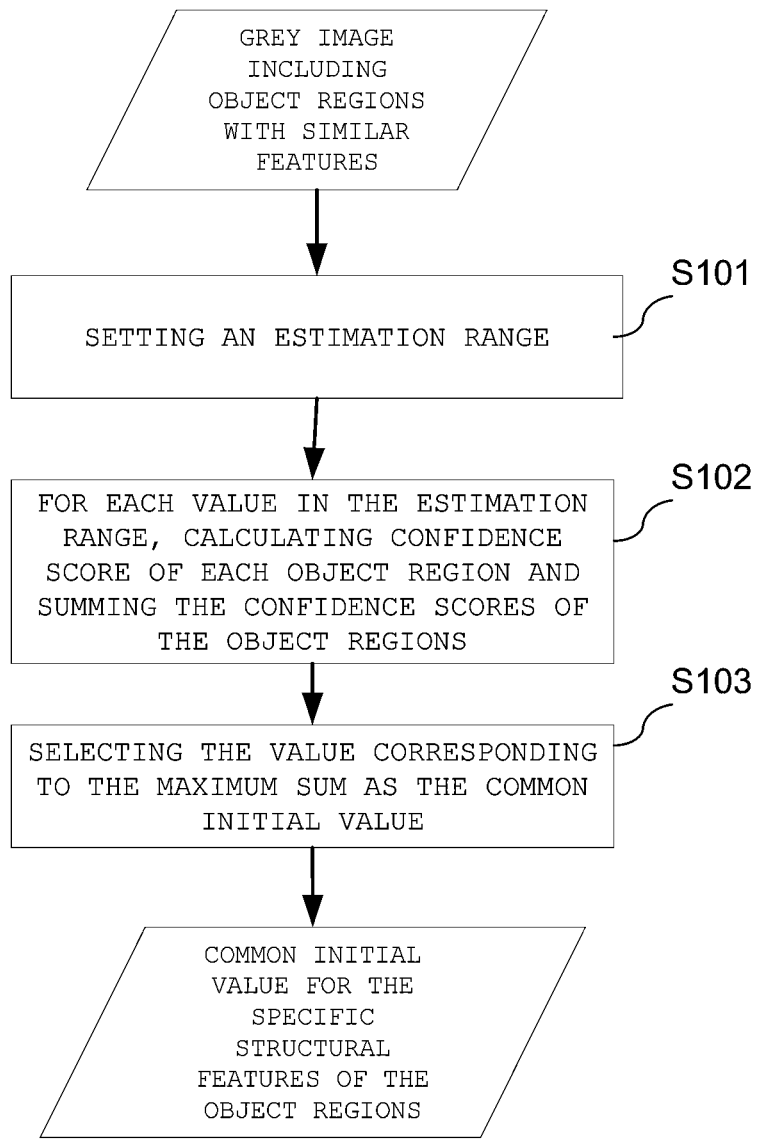
FIG. 3B is a flow chart illustrating the process in the estimation step.
Figure 3C:
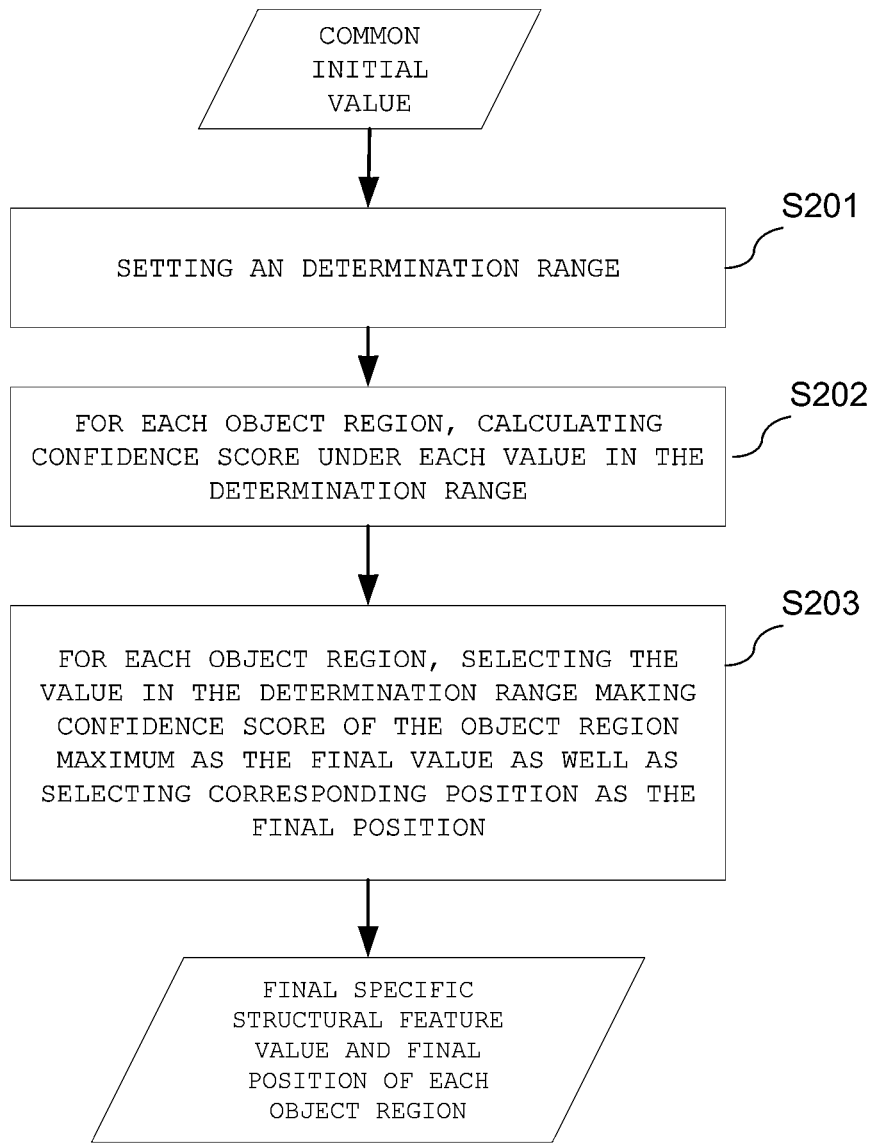
FIG. 3C is a flow chart illustrating the process in the determination step.

Hereinafter the object detection method according to the basic embodiment of the present invention will be described with reference to FIGS. 3A to 3C, which show the process in the method according to the basic embodiment of the present invention.

The method according to the basic embodiment of the present invention is a method for detecting a plurality of object regions in an image, the plurality of object regions have similar specific structural features and may contain two or more such object regions.

In step S100 (hereinafter to be referred as estimation step), a common initial value for the specific structural features of the plurality of object regions is estimated.

In step S200 (hereinafter to be referred as determination step), a final value for the specific structural feature of each of the plurality of object regions and a final position thereof are determined based on the estimated common initial value for the specific structural features of the plurality of object regions separately, wherein the final position is a position in the object region corresponding to the determined final value.

Hereinafter, the processes in the estimation step will be described with respect to FIG. 3B.

In step S101, an estimation range for the common initial value of the specific structural features of the plurality of object regions is set.

In step S102, for each value in the estimation range, a confidence score of each of the plurality of object regions is calculated, and the calculated confidence scores of respective object regions in the plurality of object regions are summed.

In step S103, the value in the estimation range corresponding to maximum sum of the calculated confidence scores of respective object regions in the plurality of object regions is selected as the common initial value of the specific structural features of the plurality of object regions. Therefore, the specific structural features of the plurality of object regions would have the same initial value.

The estimation range set in the step S101 may be set in consideration of respective characteristic of the plurality of object regions depending on the object category, and usually may be set in consideration of relative position relationship between the plurality of the object regions, such as the distance therebetween, etc.

A confidence score of an object region can be calculated by many kinds of algorithms known in the art, such as integro-differential operator disclosed in Daugman, etc., and thus its detail is not described in this part for sake of clarity.

In the basic embodiment, a confidence score of an object region for a value of a specific structural feature may be a maximum among the confidence scores of the object region which are calculated at each position in the object region. In one implementation, the process for calculating a confidence score of an object region for a value of a specific structural feature in S102 may comprise: calculating a confidence score for the value of the specific structural feature at each position in the object region; and selecting the maximum among the calculated confidence scores at each position of the object region as the confidence score of the object region for the value of the specific structural feature. A position in an object region in the calculation may mean a pixel position in the object region at which the specific structural feature is positioned. The calculation of confidence score also can be implemented in other manner with respect to the object region.

Furthermore, in one implementation, such calculation may be performed on a predetermined number of positions included in the object region to speed up the calculation, and the predetermined number of positions may be chosen by the operator according to predetermined criterions.

Hereinafter, the processes in the determination step will be described with reference to FIG. 3C.

In step S201, a determination range is set for the final value of the specific structural features based on the common initial value of the specific structural features.

In step S202, for each of the plurality of object regions, a confidence score for each value in the determination range for the object region is calculated.

In step S203, for each of the plurality of object regions, a value in the determination range which makes the confidence score of the object region maximum is selected as the final value of the specific structural feature, and the position in the object region where the confidence score of the object region is maximum (that is, the final value of the specific structural feature is positioned) is designated as the final position of the specific structural feature of the object region. Wherein, the maximum confidence score of the object region means the maximum among the set of confidence scores of the object region for all the values in the determination range.

In such determination step, the calculation of confidence score of an object region for a value of a specific structural feature in step S202 may be implemented in a similar manner with that in the estimation step, that is, calculating a confidence score for the value of the specific structural feature at each position in the object region; and selecting the maximum among the calculated confidence scores at each position in the object region as the confidence score of the object region for the value of the specific structural feature.

Alternatively, the confidence score to be calculated in the determination step also may be obtained from the result of the calculation of the confidence score in the estimation step. For example, in a case that the determination range is smaller than the estimation range, that is, the end points of the determination range are included in the estimation range, the confidence score to be calculated in the determination step may be obtained directly from the calculation result of the confidence score in the estimation step.

The final position is a position corresponding to the final value of specific structural feature of the object region, and usually is a position in the object region at which the specific structural feature is positioned and may be a specific position in the object region depends on the shape of the object region, as described above. For example, when the object region is a circular or quasi-circular shaped region, the final position usually is the circular center of the object region, and when the object region is a rectangular or line shaped region, the final position usually is the end points of its width or length, or the center point in the direction of its width or length of such rectangular or line shaped region.

With the processes in the method described above, the object regions in an image may be accurately detected.

Generally, for an input image of the method according to the basic embodiment of the present invention, the initial shape and scale of the object regions in the input image may be roughly detected by means of techniques well known in the art, before the estimation of the common initial value, and thus the processes in the method according to the basic embodiment may be executed based on the roughly detected results. The rough detection can be performed in many kinds of techniques well known in the art and thus will not be described in detail.

To further improve the accuracy of the object region detection, the object regions in the input image may be appropriately corrected before the execution of the process in the estimation step.

Generally, there may be many kinds of defects in the input image. Among others, specular reflections may appear in the object region as the brightest points in the object region and would inevitably destroy the structure of the object region and thus adversely affect the accuracy of the object region detection. Therefore, to further improve the detection accuracy, the specular reflections appearing in the input image may be firstly corrected.

The specular reflections in an image can be corrected by a number of techniques, and a common technique is to correct the grey values of specular reflection areas in the object regions. A specular reflection area is an area encompassing the specular reflections in the input image, and its size usually is set in consideration of the trade-off between accuracy and computation efficiency. For example, since specular reflection appears in the input image as the brightest points in the input image, an area with top 5% brightness intensity will be set as the particular area to be corrected. Even though some non-specular reflections (e.g., the bright eyelid region due to oversaturation) are corrected, little or even no harm is done (to the eye structure).

In one implementation of the correction process, the specular reflection area may be filled by a global threshold which may denote a certain grey value, in the input image. For example, the global threshold may be set as 70% average grey value of the object region. More specifically, the grey value in the specular reflection area may be replaced by the global threshold. Of course, the correction also can be implemented by any other kinds of techniques in the art.

As described above, the calculation of the confidence score of an object region may be performed with respect to each position in the object region. Therefore, number of the pixel positions included in the object region where the calculation is to be performed significantly affects the calculation speed of the confidence score of the object region.

To speed up the calculation of the confidence score of an object region without adversely affecting the accuracy of the calculation, the method may comprise a pre-processing step for pre-processing the object region to decrease the area where the calculation of the confidence score would be performed.

In the pre-processing step, each of the plurality of object regions is processed so as to obtain a partial region in which the final position would likely appear in the object region. In an implementation, the partial region may be determined depending on the grey intensity distribution of the grey image of the object region. For example, an area having a predetermined size and shape with the lowest grey intensity in such grey image would be determined as the partial region.

Of course, the pre-processing may be preformed with respect to the binarized image, and in such binarized image case, the partial region would be determined depending on the black pixel density distribution of the binarized image of the object region. For example, an area having a predetermined size and shape with the maximum number of black pixels in such binarized image would be determined as the partial region.

Figure 4:
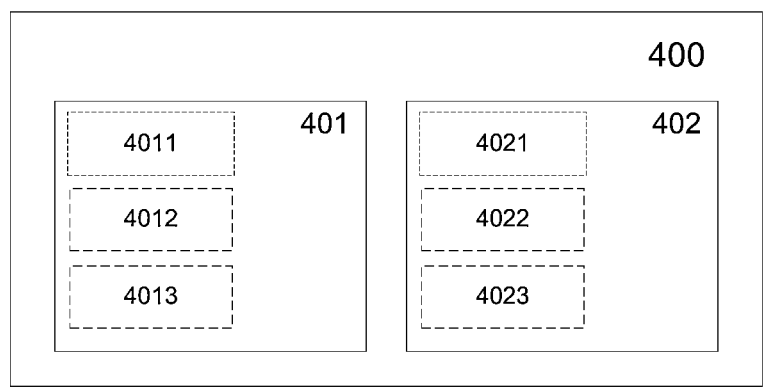
FIG. 4 is a block view illustrating the corresponding apparatus according to the basic embodiment of the present invention.

FIG. 4 is a block view illustrating the object region detection apparatus according to the basic embodiment of the present invention. The apparatus 400 may comprise estimation unit 401 configured to estimate a common initial value for the specific structural features of the plurality of object regions, and determination unit 402 configured to determine a final value for the specific structural feature of each of the plurality of object regions and a final position thereof based on the estimated common initial value for the specific structural features of the plurality of object regions separately, wherein the final position is a position in the object region corresponding to the determined final value.

The estimation unit 401 may comprise a unit 4011 configured to set an estimation range for the common initial value of the specific structural features of the plurality of object regions, a unit 4012 configured to, for each value in the estimation range, calculate a confidence score of each of the plurality of object regions and sum the calculated confidence scores of respective object regions in the plurality of object regions, and a unit 4013 configured to select the value in the estimation range corresponding to maximum sum of the calculated confidence scores of respective object regions in the plurality of object regions as the common initial value of the specific structural features of the plurality of object regions.

The determination unit 402 may comprise a unit 4021 configured to set a determination range for the final value of the specific structural features based on the common initial value of the specific structural features, a unit 4022 configured to, for each of the plurality of object regions, calculate a confidence score for each value in the determination range, and a unit 4023 configured to, for each of the plurality of object regions, select a value in the determination range which makes the confidence score of the object region maximum as the final value of the specific structural feature, and designate the position in the object region where the confidence score of the object region is maximum as the final position of the specific structural feature of the object region.

[Good Effect]

As described above, the solutions proposed in the embodiment do not only consider the similarity in plural areas of the object category, but also consider the actual location for each of plural areas in the image separately, and thus can simply solve the problems of general methods and achieve accurate object detection.

Furthermore, the correction processing for correcting the defects in the image and the pre-processing for obtaining the partial region can further improve the detection accuracy and speed up the calculation, separately. Of course, such two processing may be combined so as to achieve both of the improvement of detection accuracy and speed-up of the calculation.

Hereinafter, two examples with different object category of the basic embodiment of the present invention will be described to facilitate the thorough understanding of the solution of the present invention. Please note that the two examples are only illustrative, and the solution of the present invention is not so limited, but can be applied to any other type of object regions with similar specific structural feature therebetween.

Example 1

Hereinafter, the method for object detection of the present invention will be described by taking human eye pupil as an example.

In such case, a plurality of object regions in an image to be detected may comprise two eye pupils in a human face, and actually the circular boundary of the eye pupil region is to be detected. Since the human eye pupils are usually in a circular shape, the object regions are determined as being circular shape, the specific structural feature of the object region is the radius of the circle defined by the circular boundary of the object region, and the position of the object region corresponding to the specific structural feature is the center of the circle defined by the circular boundary of the object region.

Hereinafter, the processes in the method of the above basic embodiment will be described with respect to the case of human eye pupil. Please note that any other type of objects with the circular shape also can be similarly processed and detected, such as eyeglass, etc.

In such human eye pupil detection case, a common initial value for the radius of each of the two eye pupil regions would be firstly estimated, and then a final value for the radius of each of the two eye pupil regions, and a corresponding final center thereof would be determined based on the estimated common initial value for the radius of the two eye pupil regions separately.

Please note that when there exists many faces in an image, the human eye pupil detection process according to the present invention may be performed on two eye pupil in each face in the image.

Figure 5A:
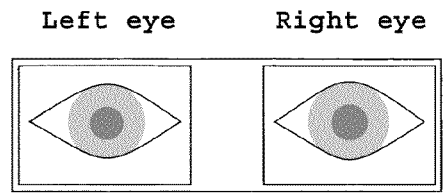
Figure 5B:
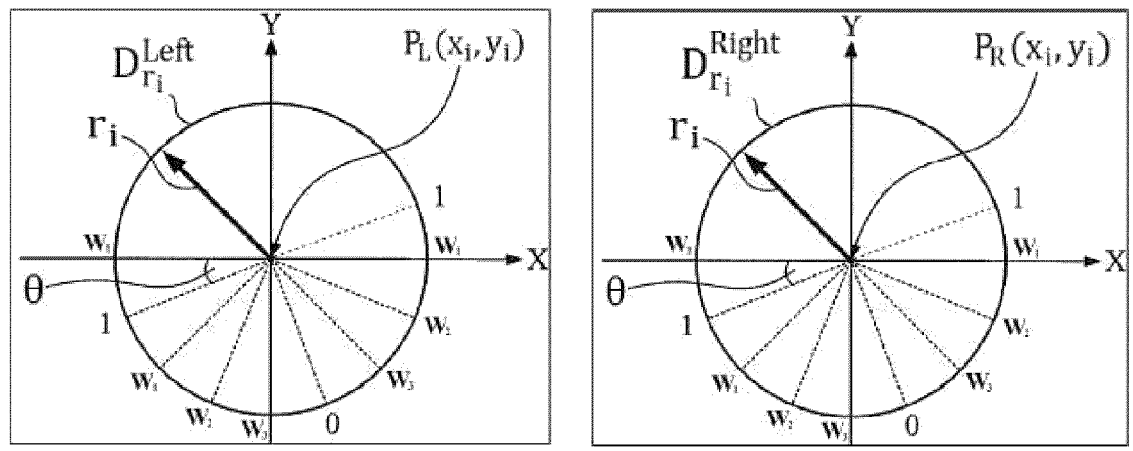

The processes in the common initial value estimation for radius of eye pupil region will be described with reference to FIGS. 5A and 5B, wherein FIG. 5A is a schematic view of two eye pupil regions in an input image, and FIG. 5B schematically illustrates the estimation process with respect to the two eye pupil regions.

In the estimation process, the estimation range of the radius of eye pupil region will be firstly set, such as, according to the relative position relationship of the two eyes in the image.

Figure 6:
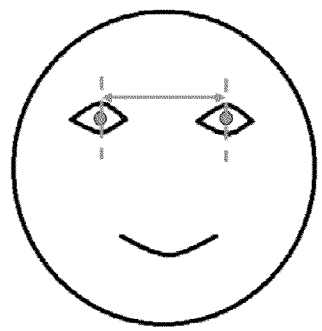
FIG. 6 schematically illustrates the distance between the two eye pupil regions.

The estimation range may be expressed as $[r_{min}, r_{max}]$, wherein $r_{min}$ and $r_{max}$ are related to the distance $d_e$ between the locations of the two eyes, and the distance $d_e = \sqrt{(x_{left}-x_{right})^2+(y_{left}-y_{right})^2}$, as shown in FIG. 6, wherein $(x_{left}, y_{left})$, $(x_{right}, y_{right})$ denotes the two-dimensional coordinates of locations of the left eye and right eye in x-y plane. In an implementation, the range may be set as $r_{min}=d_e/8$, and $r_{max}=d_e/4$.

The distance $d_e$ and thereby the estimation range for the common initial value of the radius of the eye pupil region usually may be set based on the roughly detected eye locations.

As described above, the object regions in an input image generally may be roughly localized firstly. With respect to the eye pupil regions in an image, the face in the image can be detected using a face detector, and then an initial shape and scale of the face can be estimated from the bounding box of the face. In one implementation, a multi-view face detector based on boosting nested cascade detector, as disclosed in Huang C, Ai H Z, Wu B, Lao S H. "Boosting nested cascade detector for multi-view face detection", Proceedings of the 17th International Conference on Pattern Recognition. Washington D.C., USA: IEEE. 2004. pp: 415-418, may be used, and the face detector can provide the face location.

Consequently, the two eye locations in the image may be roughly detected based on the face location, and the eye location may be the center of the eye which was roughly detected, as shown in FIG. 5A. In one implementation, the region sizes as well as relative position of two eyes may be obtained by face alignment, such as ASM (Active Shape Model), as described in Tim Cootes, "An Introduction to Active Shape Models", Image Processing and Analysis, 2000. Therefore, the distance $d_e$ can be determined from the roughly detected relative position of the two eyes, and thereby the estimation range for the common initial value of the radius of the eye pupil region may be set.

Then, the confidence scores for each of the eye pupil regions under each value of the radius in the estimation range are calculated separately, as shown in FIG. 5B. As in the basic embodiment, the confidence score of the eye pupil region under a value of the radius is also calculated at each position in the eye pupil region and the maximum among the confidence scores at all positions in the eye pupil region under the value of the radius is selected as the confidence score of the eye pupil region under the value of the radius.

For the confidence score under each value of the radius, the best known and thoroughly examined iris location algorithm proposed by Daugman may be used. Daugman used the following integro-differential operator, as show in Equation (1) to find the circular boundaries of an iris, as disclosed in M. Shamsi, P. Bt Saad, S. Bt Ibrahim, and A. R. Kenari, "Fast Algorithm for Iris Localization Using Daugman Circular Integro Differential Operator" in Proc. Soft Computing and Pattern Recognition (SOCPAR), 2009:

$$\max_{(r,x_0,y_0)} \left| \frac{\partial}{\partial r} G_\sigma(r) * \oint_{r,x_0,y_0} \frac{I(x,y)}{2\pi r} ds \right| \quad (1)$$

Where $I(x, y)$ represents the image intensity at location($x$, $y$), $G_\sigma(r)$ is a smoothing function with a Gaussian scale $\sigma$, and * denotes convolution. The operator searches for the maximum in the blurred partial derivatives in terms of increasing radius r of the normalized contour integral of $I(x, y)$ along a circular arc ds of radius r and center coordinates ($x0$, $y0$). For calculating integro-differential operator, the difference value between inside and outside pixel values on contour of iris edge's circle needs to be calculated. The difference value is taken as the confidence score in our invention.

Considering that calculation of the difference value of all pixels on circle contour is clearly impossible for the viewpoint of computation overhead, an upper limit and a lower limit of the circle sample may be adjusted. The circle sample assesses that how many points should be accessed on circle contour for computing integro-differential operator. It also corresponds to angle division around the circle contour. In one implementation, neighbor points less than 10 pixels may be chosen from the roughly localized initial pupil center to compute integro-differential operator, which can largely narrow down the search range of the pupil center and speed up the pupil location. Please note that such operation mainly aims to reduce the computation overhead, and is not necessary.

Moreover, the upper part and the lower part of pupil is often occluded by eyelid and eyelash, as disclosed in Zhifei Xu and Pengfei Shi, "A Robust and Accurate Method for Pupil Features Extraction", ICPR, 2006. In one implementation of the present invention, these parts are not thrown off, but smaller weight value is given to these parts. This is because that the number of the total edge points is small and the edge points of these parts sometimes have important information for the detection of pupil parameters. The weighted value is defined in Equation (2).

$$w = \begin{cases} 255 & -\pi/3 \le \theta \le \pi/6 \cup 5\pi/6 \le \theta \le 4\pi/3 \\ 255 \times (1-(\theta-\pi/6)/(\pi/3)) & \pi/6 \le \theta \le \pi/2 \\ 255 \times (1-(\pi-\theta-\pi/6)/(\pi/3)) & \pi/2 \le \theta \le 5\pi/6 \\ 255 \times (1-(\theta-4\pi/3)/(\pi/6)) & 4\pi/3 \le \theta \le 3\pi/2 \\ 255 \times (1-(\pi-\theta-4\pi/3)/(\pi/6)) & 3\pi/2 \le \theta \le 5\pi/3 \end{cases} \quad (2)$$

Where $\theta$ denotes an angle of a point on the current circumference of the eye pupil being determined.

In Equation (2), the weighted value of the lower part of pupil is larger than that of the upper part, this is because that upper part is more often occluded than the lower part of the pupil by the eyelid and eyelash. What is more, the weighted value is linear decreased with respect to $\theta$ by considering the probability of occlusion by eyelid and eyelash.

Through the weighted operator, the accuracy of solving gradient information of boundaries of pupils can be improved, and thus the accuracy of confidence scores also can be improved.

However, the weighted value of each edge point changes when the eye tilted. This still may result in the inaccuracy of confidence scores. Therefore, to further improve the accuracy of confidence scores, the rotation angle (i.e. the head tilting angle) needs to be found beforehand.

Figure 7:
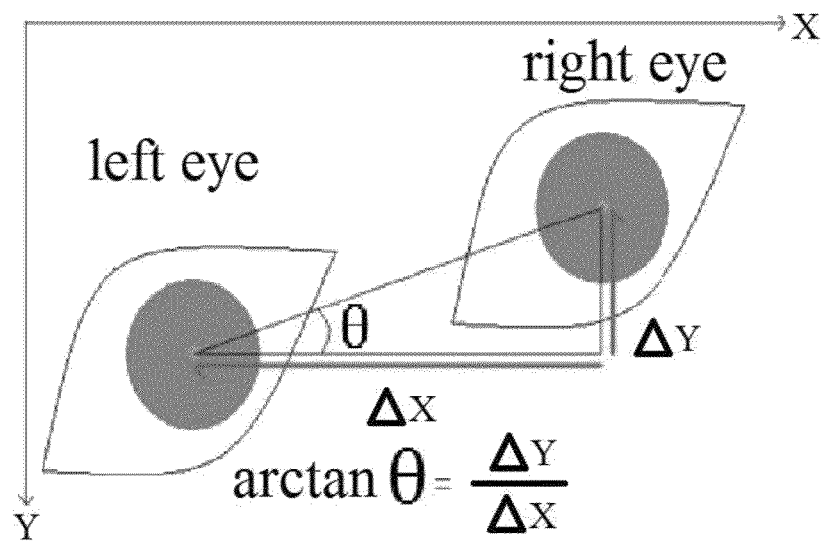
FIG. 7 schematically illustrates tilt correction for confidence score calculation of two eye pupil regions.

Based on the coordinate of each eye feature point obtained by face alignment, the center coordinates of both left eye and right eye can be obtained. The rotation angle $\theta r$ can be obtained accordingly, as shown in FIG. 7. Once the rotation angle $\theta r$ is obtained, the modified angle is equal to mod($\theta-\theta r+360, 360$), where $\theta$ denotes an angle of a point on the current circumference of the eye pupil being determined. Then, the weighed value may be modified by means of the above Equation (2) and the modified angle.

Therefore, the confidence score of the two eye pupil regions in the image would be obtained as described above.

Next, the confidence scores of two eye pupil regions under the same value of the radius $r_i$ will be summed as in the following Equation.

$$\text{Score}(r_i) = \text{Score}_{Left}(r_i) + \text{Score}_{Right}(r_i)$$

Where $\text{Score}_{Left}(r_i)$ and $\text{Score}_{Right}(r_i)$ denote the confidence score of the left eye pupil region and right eye pupil region under the same value of the radius $r_i$.

Consequently, the radius $r_i$ in the estimation range corresponding to the maximum sum Score ($r_i$) may be selected as the common initial value of the radius of the two eye pupil regions, and the center of the eye pupil region corresponding to the radius also can be determined, as expressed as $P_L(x_i, y_i)$ and $P_R(x_i, y_i)$ denoting the center of the left pupil and right pupil respectively.

Figure 5C:
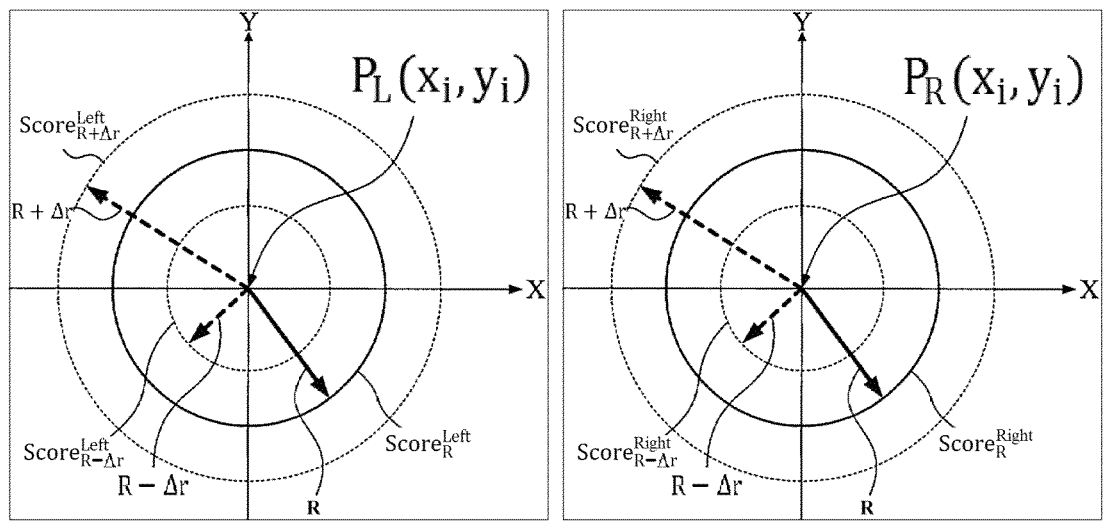

Hereinafter, the process in the determination for final value of radius of the two eye pupil regions as well as their corresponding position will be described with reference to FIG. 5C.

In this process, based on the calculated common initial value for the radius of the two eye pupil regions, final value for the radius in each eye pupil region as well as its corresponding center could be determined separately.

The determination range used in the determination process is set based on the calculated common initial value, and usually can be expressed as [R−Δr, R+Δr], wherein R is the calculated common initial value, and Δr can be set in consideration of the accuracy and efficiency, and usually is related to R. In one implementation, Δr can be set as R/5.

Then, for each value of the radius in the determination range [R−Δr, R+Δr], the confidence score of each of the two eye pupil regions would be calculated separately, and for each of the two eye pupil regions, a value of a radius in the determination range which makes the confidence score thereof maximum would be the final value for the radius of the eye pupil region, that is, the best radius for the eye pupil region, and the center corresponding to the final value for the radius would be the center of the eye pupil region. Please note that in such determination process, the maximum confidence score (i.e., integro-differential values) $D_{Leftmax}$ and $D_{Rightmax}$ for the left eye and the right eye respectively for the range [R−Δr, R+Δr] are calculated separately.

In particularly, for the calculation of a confidence score for an eye pupil region for a value of a radius in the determination range, a common manner is to calculate the confidence score for the eye pupil region for a value of a radius in the determination range in a manner similar to that in the estimation step, that is, calculating the confidence score at each position in the eye pupil region under the value of the radius, and selecting the maximum among the confidence scores under all positions as the confidence score of the eye pupil region for the value of the radius.

Alternatively, the calculation may be performed on a predetermined number of positions in the eye pupil regions, as that in the calculation in the estimation process.

Alternatively, the calculation may be based on the center determined in the above estimation process, that is, in the calculation in the determination process, the center determined in the above estimation process may remain unchanged, and only the value of the radius would be changed in the determination range.

Furthermore, in another implementation, the confidence score result also can be directly obtained from the calculation result obtained in the estimation step in a case that the determination range is usually included in the estimation range, so as to further reduce the computation overhead.

Figure 5D:
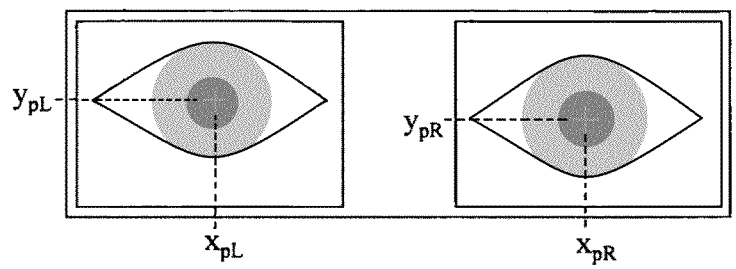

From the above processes, the radius and center of a circle corresponding to a boundary of a pupil in an image would be accurately determined, so that the eye pupil regions in the image may be accurately determined as shown in FIG. 5D.

Furthermore, as described above, to further improve the detection accuracy, the eye pupil region in the image may be corrected with respect to the specular reflections therein in advance, as shown in FIGS. 8A to 8B.

Generally, the specular reflections may appear in the eye image, especially when the user wears glasses, and appear as the brightest points in the eye image, as shown in FIG. 8A.

In the implementation of the example, the areas with top 5% brightness intensity in the eye image would be selected as the adaptive areas for the trade-off between accuracy and computation efficiency to be corrected. Then, a global threshold which denotes a certain grey value, in an eye image is used to fill these areas. The global threshold may be set as 70% average grey value. The results of specular reflection removal are shown in FIG. 8B.

Furthermore, the two eye pupil regions may be pre-processed so as to reduce the computation overhead and speed up the calculation.

Inspired by integral image, a rectangular sliding window is used to search the pupil center in this example. The height and width of the rectangular sliding window may be set as (de/8+1) and (de/8+3), respectively. An area with the lowest grey intensity under the sliding window would be selected as a partial region in which the final position would likely appear in the eye pupil region, and the center of the area with the lowest grey intensity under the sliding window is estimated as the rough pupil center, as shown in left part in FIG. 9.

The pre-processing as described above is described with respect to a grey image, and the selection of the partial region is based on the grey intensity. However, the implementation of pre-processing is not so limited, and it also can be directed to a binarized image, and in such case, the selection of the partial region is based on the black pixel density, that is, an area with the maximum number of black pixels under the sliding window would be the partial region and its center would be estimated as the rough pupil center, as shown in right part in FIG. 9.

Therefore, the calculation of confidence scores of the eye pupil region would be limited to such partial region and thus the computation overhead would be reduced. In one implementation, the calculation of confidence scores may with respect to each position in such partial region. In another implementation, the calculation of confidence scores may even be based on the estimated center of such partial region so as to further reduce the computation overhead.

The sliding window can be in other shapes depending on the image, such as circular sliding window. For algorithm optimization, compared with the circular sliding window, integral image can largely speed up the search procedure based on the rectangular sliding window. Firstly the integral of each pixel in the eye image need not to be calculated. Then for any rectangular area under the rectangular sliding window, only the integral values of the four vertexes need to be adopted to determine the sum of grey values of the rectangular area.

Figure 10:
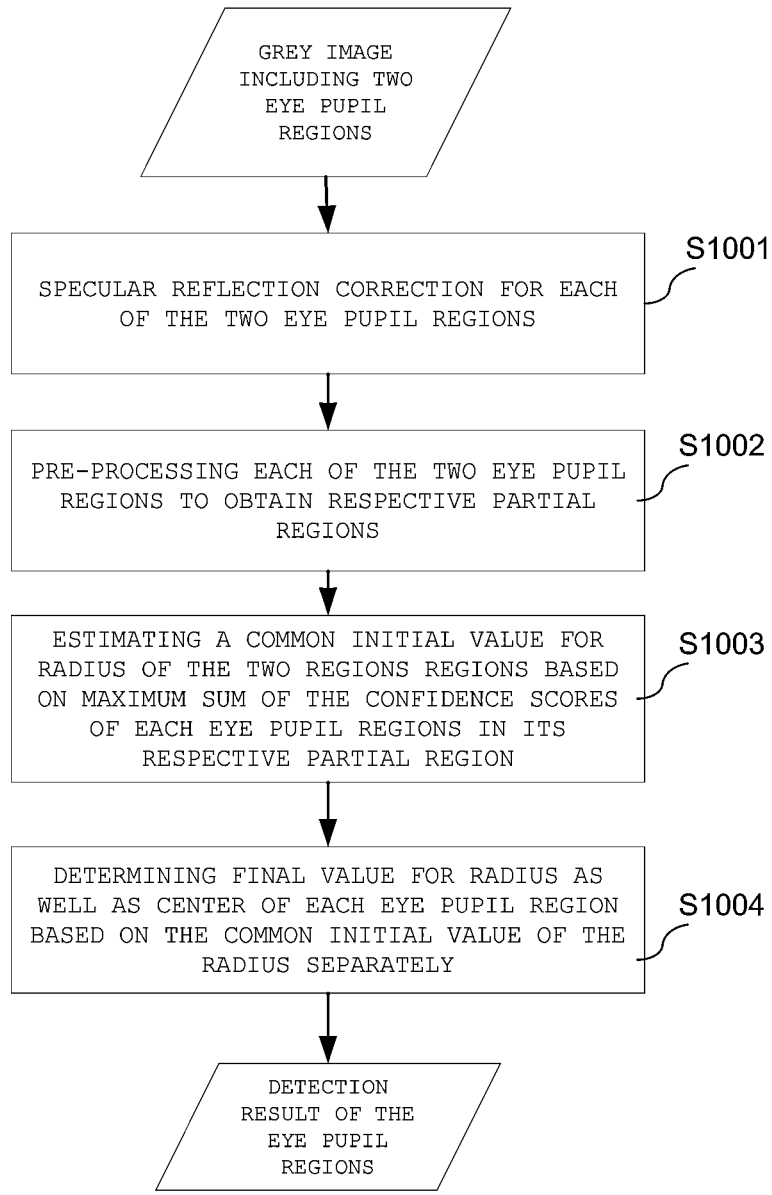
FIG. 10 is a flowchart illustrating a preferred implementation of the eye pupil region detection according to the present invention.

Hereinafter, a preferred implementation for eye pupil region detection according to the present invention will be described with reference to the flowchart of FIG. 10 so as to facilitate the thorough understanding of the eye pupil region detection. Please note that the eye pupil region detection process according to the present invention is not so limited, and some step in such flowchart, such as specular reflection correction and pre-processing step, also may be omitted without adversely affecting the basic advantageous effect of the eye pupil region detection process according to the present invention.

In step S1001, the two eye pupil regions in an image are corrected with respect to specular reflection as described above.

In step S1002, the two eye pupil regions may be pre-processed respectively to find respective partial region therein as described above.

In step S1003, a common initial value for the radius of two eye pupil regions is estimated in a manner similar with the above.

More specifically, an estimation range for the radius of the two eye pupil regions is set, and then for each value in the estimation range, a confidence score of each of two eye pupil regions in its respective partial region is calculated, the value in the estimation range corresponding to maximum sum of the calculated confidence scores of respective eye pupil region in its respective partial region is selected as the common initial value for the radius of the two eye pupil regions.

In step S1004, the final value for the radius of each of the two eye pupil regions as well as the center thereof are determined based on the estimated common initial value separately in a similar with the above.

More specifically, a determination range for the final radius of each of the two eye pupil regions is set based on the estimated common initial value of the radius, then, for each of the two eye pupil regions, a value in the determination range which makes the confidence score of the eye pupil region in its respective partial region maximum is selected as the final value of radius, and the center of the eye pupil region corresponding to the final value of the radius is designated as the final center of the eye pupil region.

Figure 11:
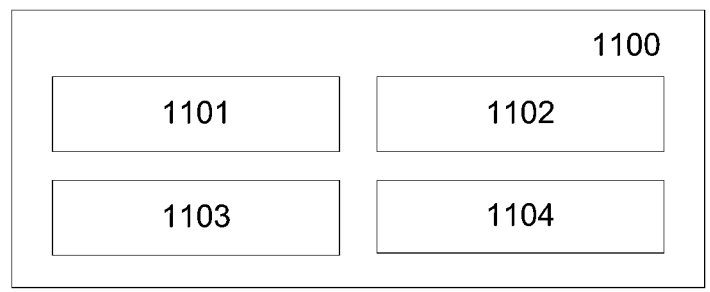
FIG. 11 is a block view illustrating an eye pupil region detection apparatus according to the present invention.

FIG. 11 is a block view illustrating an eye pupil region detection apparatus according to the present invention.

The apparatus 1100 may comprise an estimation unit 1101 configured to estimate a common initial value for the radii of the two eye pupil regions and a determination unit 1102 configured to determine, for each of the two eye pupil regions, a final value for the radius of the eye pupil region and a final center of the eye pupil region separately based on the estimated common initial value.

The estimation unit 1101 may comprise a unit configured to set an estimation range for the common initial value of the radii of the two eye pupil regions; a unit configured to, for each value in the estimation range, calculate a confidence score of each of the two eye pupil regions, and sum the calculated confidence scores of respective eye pupil region in the two eye pupil regions; and a unit configured to select the value in the estimation range corresponding to maximum sum of the calculated confidence scores of respective eye pupil region in the two eye pupil regions as the common initial value.

The determination unit 1102 may comprise a unit configured to set a determination range for the final value of the radii based on the common initial value; a unit configured to, for each of the two eye pupil regions, calculate a confidence score for each value in the determination range for the eye pupil region; and a unit configured to, for each of the two eye pupil regions, select a value in the determination range which makes the confidence score of the eye pupil region maximum as the final value of the radius of the eye pupil region, and designate a position in the eye pupil region where the confidence score of the eye pupil region is maximum as the final center of the eye pupil region.

The apparatus 1100 may further comprise an eye pupil region correction unit 1103 configured to perform specular reflection correction for each of the two eye pupil regions, and an eye pupil region pre-processing unit 1104 configured to, for each of the two eye pupil regions, pre-processing the eye pupil region to obtain a partial region in which the final center likely appears in the eye pupil region.

Figure 12:
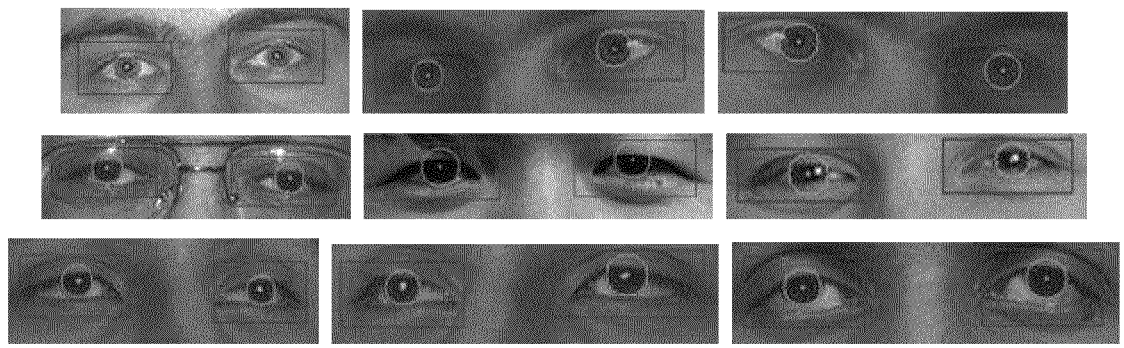
FIG. 12 illustrates some detection results for eye pupil regions in an image.

FIG. 12 illustrates some detection results for eye pupil regions in an image, in which it is clear that the detected circular boundaries of pupils accurately comply with the contour of the pupils and the sizes of the circular boundaries of the pupils are almost the same.

[Good Effects]

The present inventor has tested the performance of the human eye pupil detection solution (i.e. the common technique in the art) based on single eye and that of the solution according to the present invention on a face dataset including more than 5000 images, wherein, error detection rate is used to evaluate the method, and the result (i.e. the distance between the detected position and ground truth) beyond 5 pixels would be deemed as the error detection result. The number of the error detection images based on the pupil detection solution based on single eye is 217. Table 1 gives the performance comparison between the solution of the present invention and the pupil detection solution based on single eye on 217 images. From Table 1, it shows a clear improvement in performance for pupil detection, involving the pupil center and radius from the present invention.

TABLE 1

| Method | No. of test images | No. of correctly detected pupil centers | Error detection rate for more than 5000 images | The average radius error |
| --- | --- | --- | --- | --- |
| The method based on single eye | 217 | 0 | 4.3% | 4.1 pixels |
| Our invention | | 179 | 0.7% | 2.3 pixels |

Figure 13A:
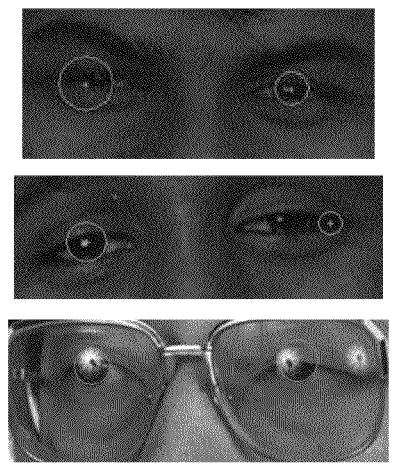
FIGS. 13A and 13B illustrates the comparison between the detection result obtained by the common techniques in the art and the method according to the present invention.
Figure 13B:
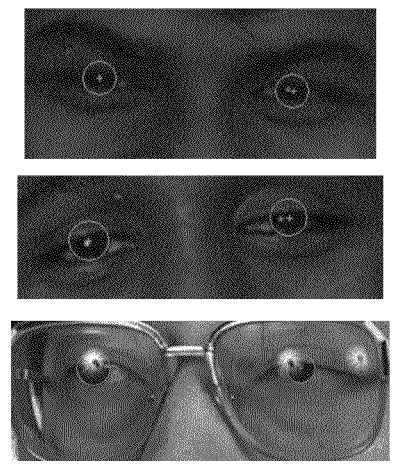

FIGS. 13A and 13B visually illustrate the comparison between the detection result obtained by the common techniques in the art and the method according to the present invention, wherein FIG. 13A shows views illustrating the detection result obtained by the common techniques in the art and FIG. 13B shows views illustrating the detection result obtained by the pupil detection method of the present invention. It is clear that the circular boundaries of the pupils obtained by the common techniques in the art usually do not comply with the contour of the respective pupils, even cannot be properly localized, and the sizes of the circular boundary of the two pupils which usually shall be the same are distinct from each other. On the contrary, the circular boundaries of the pupils obtained by the present invention can be properly localized and comply with the contour of respective pupils, and the size of the circular boundary of the two pupils are almost the same. Therefore, the present invention significantly improves the pupil detection.

Example 2

Hereinafter, the method for object detection of the present invention will be described by taking human first as an example.

In such case, a plurality of object regions in an image to be detected are the fingers in the first image, and actually the width of the fingers is to be detected. Since the first can be abstractly expressed in a rectangular or linear shape, the specific structural feature of the object region is the width of finger limited by the boundary of the finger, that is the apertures between the fingers, and the position of the object region corresponding to the specific structural feature is the end points of a line representing width of the object region, or the center point of the line in the direction of width of the object region.

Hereinafter, the processes in the detection method will be described with respect to the case of first fingers. Please note that any other type of objects with the rectangular or line shape also can be similarly processed and detected, such as legs, etc.

In such first detection case, a common initial value for the width of each of finger regions included in the first image would be firstly estimated, and then a final value for the width of each of the finger regions included in the first image and a corresponding end points of the line representing the width would be determined based on the estimated common initial value for the width separately.

Figure 14:
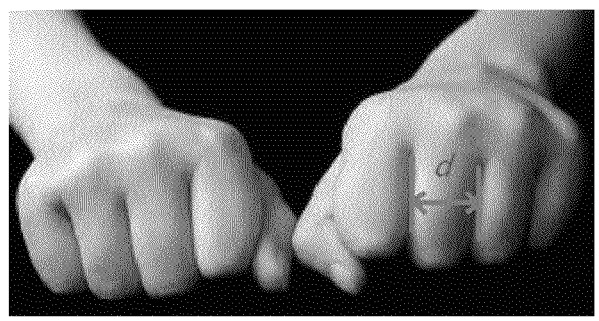
FIG. 14 illustrates the width of fingers in a fist image.

In the estimation process, the estimation range of the width of fingers is firstly set for an input image with a pair of fisted hands as shown in FIG. 14, wherein the width may be the distance between apertures between two adjacent fingers. The estimation range $[d_{min}, d_{max}]$ may be set according to the size of the first image, such as height: Fh; width: Fw of each of two fists. In this example, $d_{min}$=Fw/6, and $d_{max}$=Fw/3. Please note that the size of the first image may be roughly determined in advance.

Next, the common initial value of the distance for the finger in the fists would be selected from the estimation range. The selection is also based on the calculation of the confidence score of a finger region in the image for the estimation range, and such calculation of the confidence score may use Hough transform for each of fists.

More specifically, the image may be pre-processed by skin segmentation to get first regions. In this example, YCrCb color space is utilized to segment the two regions of fists, as disclosed in A. K. Jain, "Face Detection in Color Images", PAMI, 2002.

Then, edge detection is performed by using Sobel operator for the binary image.

Figure 15:
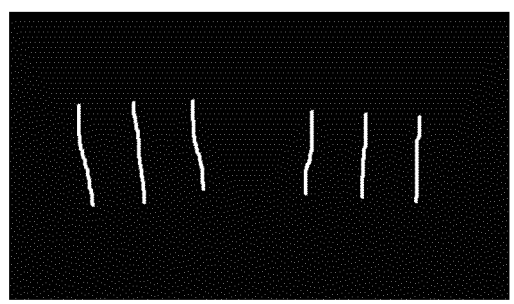
FIG. 15 schematically illustrates remained gradient information of apertures between adjacent fingers.

Further, all the background information could be removed and only the gradient information of apertures between adjacent fingers would be obtained, as shown in FIG. 15.

Next, with respect to the obtained gradient information, Hough transform is executed so as to calculate the confidence scores under each value in the estimation range.

The lines in FIG. 15 may be represented in polar coordinate space by means of Equation (3). The parameters θ and ρ is the angle of the line and the distance from the line to the origin respectively.

$$\rho = x \cdot \cos\theta + y \cdot \sin\theta \qquad (3)$$

Suppose the relation between one pixel and eight adjacent pixels is shown as follows, wherein $A_5=F(x, y)$, $A_1=f(x-1, y-1)$, $A_2=f(x, y-1)$, . . . .

| $A_1$ | $A_2$ | $A_3$ |
|---|---|---|
| $A_4$ | $A_5$ | $A_6$ |
| $A_7$ | $A_8$ | $A_9$ |

According to the Sobel operator, the gradient vectors are represented by Equation (4).

$$G_x = (A_7 + 2A_8 + A_9) - (A_1 + 2A_2 + A_3)$$

$$G_y = (A_3 + 2A_6 + A_9) - (A_1 + 2A_4 + A_7) \qquad (4)$$

So the direction angle of the gradient information can be computed as follows:

$$\sin\theta = \frac{G_y}{\sqrt{G_x^2 + G_y^2}}, \cos\theta = \frac{G_x}{\sqrt{G_x^2 + G_x^2}} \qquad (5)$$

Whereby, the distance ρ from the line to the origin could be determined by using Equation (3) and (5). Suppose ρ1, ρ2, ρ3 represent the distances from the set of lines $l_1$, $l_2$, $l_3$ to the origin respectively. As shown in FIGS. 16A and 16B, A, B, C on the parallel line $l_1$, $l_2$, $l_3$ in FIG. 16A correspond to the point (ρ1, θ), (ρ2, θ), and (ρ3, θ) in FIG. 16B.

Hough transform subdivides polar coordinate space into accumulator units, as shown in FIG. 17, wherein ($\rho_{min}$, $\rho_{max}$) and ($\theta_{min}$, $\theta_{max}$) are the expected range of the two parameters.

Each unit in the accumulator units describes one discrete point in the polar coordinate space. The corresponding ρ can be calculated by bringing each feature point in the image into every discrete value for θ. When the computed value (i.e. ρ) falls into one grid, the accumulator units perform the operation of plus 1 for the polar coordinate space. This makes the line extraction in the image as finding the maximum value by accumulator counting.

Figure 18:
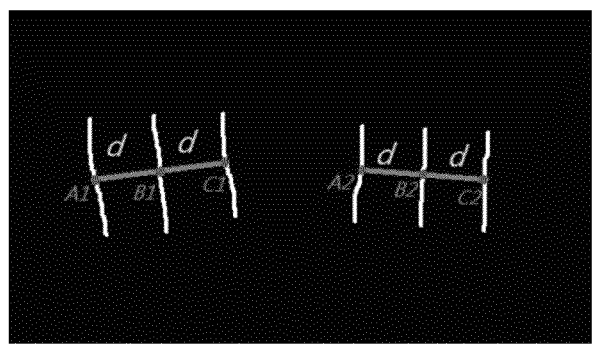
FIG. 18 schematically illustrates the calculated common initial value for width of fingers in both fists as well as corresponding locations.

For the parameter d in the two fists, the maximum accumulated value under the same $d_i$ need to be found for each of both fists separately, and the locations of points (e.g. A1, B1, C1, A2 . . . ) on the apertures are regarded as locations corresponding to the distance corresponding to the maximum accumulated value, as shown in FIG. 18. The maximum accumulated value is regarded as the confidence score of the first image. Under each di, the sum of maximum accumulated values for two fists can be obtained. The distance corresponding to the maximum of the sum would be represented as D, i.e. the common initial value for the distance d.

Hereinafter the determination process of the first detection will be described. In the determination process, the final value as well as corresponding position for the distance in each first image would be determined based on the common initial value separately.

Figure 19:
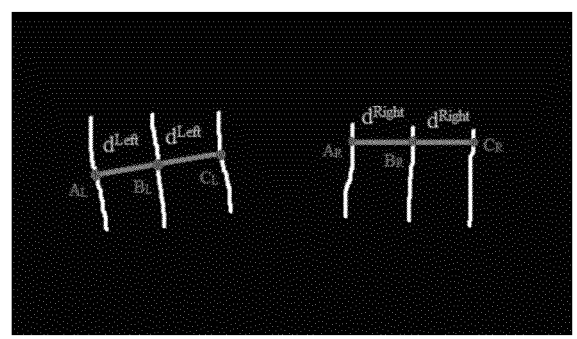
FIG. 19 schematically illustrates the final width as well as the corresponding final locations of fingers in both fists.

The determination range is set as [D−Δd, D+Δd], wherein Δd=D/5 in this example. Then, for each first image, the accumulated value in the first image would be calculated under each distance value in the above determination range, and the distance value corresponding to the maximum accumulated value would be determined as the final distance value, and the locations corresponding to the final distance value would be the final locations. As shown in FIG. 19, the final distance $d_{Left}$ and $d_{Right}$ for the left first image and right first image are determined separately, and the final locations (e.g. $A_L$, $B_L$, $C_L$, $A_R$ . . . ) corresponding to such final distance for each finger would also be determined.

The calculation of the accumulated values in the determination process could be executed by the similar manner in the estimation process. Alternatively, the accumulated values in the determination process can be directly obtained from the calculation result obtained in the estimation process.

Through the detection in this example, distance and corresponding locations of each first could be more accurately obtained.

Figure 20:
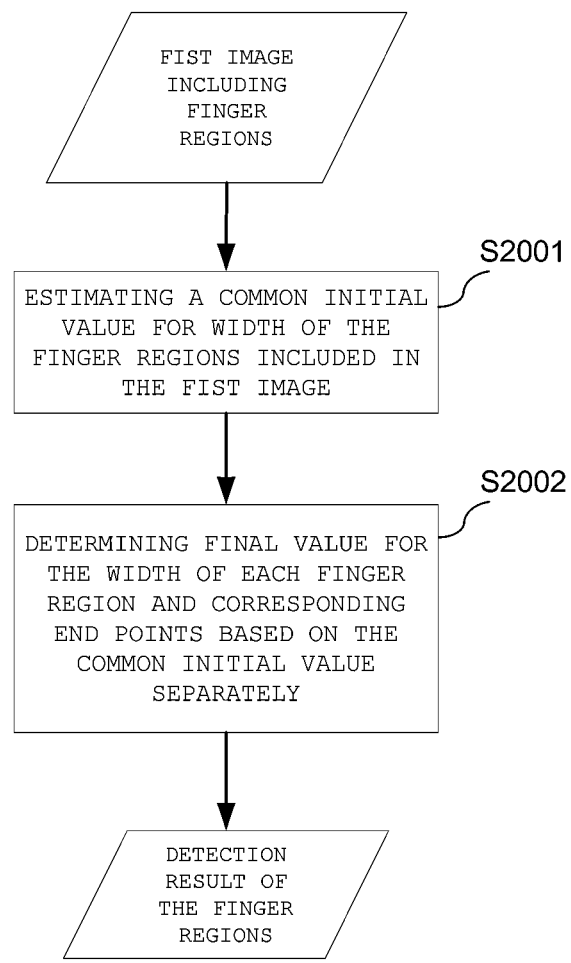
FIG. 20 is a flowchart illustrating a preferred implementation of the first detection according to the present invention.

Hereinafter, a preferred implementation for first detection according to the present invention will be described with reference to the flowchart of FIG. 20 so as to facilitate the thorough understanding of the first detection of the present invention. Please note that the first detection process according to the present invention is not so limited.

In step S2001, an estimation range for the width of finger regions included in the first image is set, and a common initial value for the width of the finger regions included in the first image is estimated in a manner similar with the above.

In step S2002, the final value for the width of each of the finger regions as well as the end points thereof are determined based on the estimated common initial value separately in a similar with the above.

Figure 21:
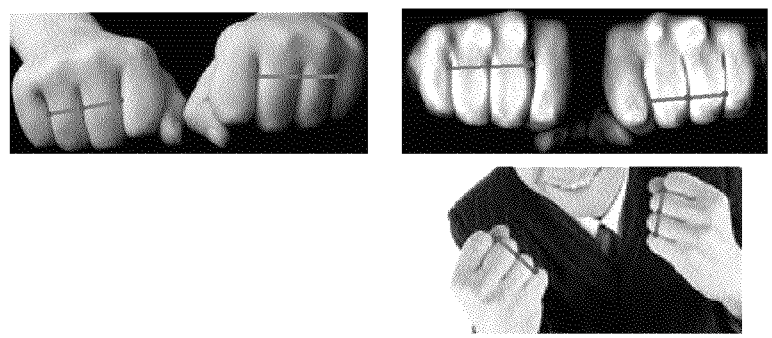
FIG. 21 illustrates the accurate finger locations achieved by the first detection of the present invention.

FIG. 21 gives some results achieved by this example, and the width of the fingers determined by the method according to the present invention accurately conforms to the finger image in the first image.

INDUSTRY APPLICABILITY

The present invention can be used in many applications. For example, the present invention could be used for detecting and tracking the movement of a plurality of object regions in an image with similar structural features.

More specifically, in an implementation, the plurality of object regions would be detected by means of the method according to the present invention, and the movement direction of the plurality of object regions could be determined by means of the final value of specific structural features and corresponding position of each of the plurality of object regions, so that the movement of the plurality of object regions could be detected and tracked. Therefore, an image with the movement information of the plurality of object regions could be obtained.

One of example is automatically detecting and tracking the gaze in a face image. Firstly, the pupils in the face image could be accurately detected by means of the method according to the present invention. Then, the view and head tilt angle would be determined according to the centers of the pupils to localize the gaze direction, so that the gaze detection and tracking could be implemented. Therefore, an image with gaze information could be obtained.

It is possible to carry out the method and apparatus of the present invention in many ways. For example, it is possible to carry out the method and apparatus of the present invention through software, hardware, firmware or any combination thereof. The above described order of the steps for the method is only intended to be illustrative, and the steps of the method of the present invention are not limited to the above specifically described order unless otherwise specifically stated.

Besides, in some embodiments, the present invention may also be embodied as programs recorded in recording medium, including machine-readable instructions for implementing the method according to the present invention. Thus, the present invention also covers the recording medium which stores the program for implementing the method according to the present invention.

Although some specific embodiments of the present invention have been demonstrated in detail with examples, it should be understood by a person skilled in the art that the above examples are only intended to be illustrative but not to limit the scope of the present invention. It should be understood by a person skilled in the art that the above embodiments can be modified without departing from the scope and spirit of the present invention. The scope of the present invention is defined by the attached claims.

What is claimed is:

1. A method for detecting a plurality of object regions in an image, the plurality of object regions having similar specific structural features, the method comprising steps of:
    setting a selection range for a common initial value of the specific structural features of the plurality of object regions;
    calculating a confidence score of each of the plurality of object regions for each value in the selection range;
    selecting a value in the selection range on the basis of the calculated confidence scores of respective object regions in the plurality of object regions as the common initial value; and
    determining, for each of the plurality of object regions, a final value for the specific structural feature of the object region and a final position thereof separately based on the selected common initial value.

2. The method according to claim 1, further comprising a step of
    summing the calculated confidence scores of respective object regions in the plurality of object regions; and
    wherein the selecting step includes selecting the value in the selection range corresponding to a maximum sum of the calculated confidence scores of respective object regions in the plurality of object regions as the common initial value.

3. The method according to claim 1, wherein the determining step comprises:
    setting a determination range for the final value of the specific structural features based on the common initial value;
    for each of the plurality of object regions, calculating a confidence score for each value in the determination range for the object region; and
    for each of the plurality of object regions, selecting a value in the determination range which makes the confidence score of the object region maximum as the final value of the specific structural feature of the object region, and designating a position in the object region where the confidence score of the object region is maximum as the final position of the specific structural feature of the object region.

4. The method according to claim 1, wherein the specific structural feature of an object region is a structural feature defining the shape of the object region.

5. The method according to claim 1, wherein the calculating step comprises:
    at each position in the object region, calculating a confidence score of the object region for the value of the specific structural feature; and
    selecting a maximum among the confidence scores of the object region at all positions in the object region as the confidence score of the object region for the value of the specific structural feature.

6. The method according to claim 1, further comprising a step of
    pre-processing the object region to obtain a partial region in which the final position likely appears in the object region for each of the plurality of object regions,
    wherein the calculating step and determining step are performed on the partial region.

7. A non-transitory computer readable storage medium storing a program for making a computer to execute the method according to claim 1.

8. A method for detecting two eye pupil regions in a face image, the two eye pupil regions having similar radii, the method comprising steps of:
    setting a selection range for a common initial value of the radii of the two eye pupil regions;
    calculating a confidence score of each of the two eye pupil regions for each value in the selection range;
    selecting a value in the selection range on the basis of the calculated confidence scores of respective eye pupil regions in the two eye pupil regions as the common initial value; and
    determining, for each of the two eye pupil regions, a final value for the radius of the eye pupil region and a final center of the eye pupil region separately based on the selected common initial value.

9. The method according to claim 8, further comprising a step of
    summing the calculated confidence scores of respective eye pupil regions in the two eye pupil regions,
    wherein the selecting step includes selecting the value in the selection range corresponding to a maximum sum of the calculated confidence scores of respective eye pupil regions in the two eye pupil regions as the common initial value.

10. The method according to claim 8, wherein the determining step comprises:
    setting a determination range for the final value of the radii based on the common initial value;
    for each of the two eye pupil regions, calculating a confidence score for each value in the determination range for the eye pupil region; and
    for each of the two eye pupil regions, selecting a value in the determination range which makes the confidence score of the eye pupil region maximum as the final value of the radius of the eye pupil region, and designating a position in the eye pupil region where the confidence score of the eye pupil region is maximum as the final center of the eye pupil region.

11. The method according to claim 8, wherein the calculating step comprises:
    at each position in the eye pupil region, calculating a confidence score of the eye pupil region for the value of the radius; and
    selecting a maximum among the confidence scores of the eye pupil region at all positions in the eye pupil region as the confidence score of the eye pupil region for the value of the radius.

12. The method according to claim 8, further comprising a step of:
    pre-processing the eye pupil region to obtain a partial region in which the final center of the eye pupil region likely appears in the eye pupil region for each of the two eye pupil regions, wherein the calculating step and determining step are performed on the partial region.

13. The method according to claim 12, wherein the pre-processing step further comprises: for each of the two eye pupil regions,
    scanning the eye pupil region by means of a rectangular sliding window with a predetermined size, and
    designating an area under the rectangular sliding window in the eye pupil region with a lowest grey intensity as the partial region.

14. The method according to claim 13, wherein the predetermined size is related to the size of the eye pupil region.

15. The method according to claim 8, wherein the selection range is determined based on the distance between the two eye pupil regions.

16. An apparatus for detecting a plurality of object regions in an image, the plurality of object regions having similar specific structural features, the apparatus comprising:
    a setting unit configured to set a selection range for a common initial value of the specific structural features of the plurality of object regions;
    a calculation unit configured to calculate a confidence score of each of the plurality of object regions for each value in the selection range;
    a selection unit configured to select a value in the selection range on the basis of the calculated confidence scores of respective object regions in the plurality of object regions as the common initial value; and
    a determination unit configured to determine, for each of the plurality of object regions, a final value for the specific structural feature of the object region and a final position thereof separately based on the selected common initial value.

17. The apparatus according to claim 16, further comprising
    a summing unit configured to sum the calculated confidence scores of respective object regions in the plurality of object regions,
    wherein the selection unit selects the value in the selection range corresponding to a maximum sum of the calculated confidence scores of respective object regions in the plurality of object regions as the common initial value.

18. The apparatus according to claim 16, wherein the determination unit comprises:
    a unit configured to set a determination range for the final value of the specific structural features based on the common initial value;
    a unit configured to, for each of the plurality of object regions, calculate a confidence score for each value in the determination range for the object region; and
    a unit configured to, for each of the plurality of object regions, select a value in the determination range which makes the confidence score of the object region maximum as the final value of the specific structural feature of the object region, and designate a position in the object region where the confidence score of the object region is maximum as the final position of the specific structural feature of the object region.

19. The apparatus according to claim 16, wherein the specific structural feature of an object region is a structural feature defining the shape of the object region.

20. The apparatus according to claim 16, wherein the calculation unit comprises:
    a unit configured to, at each position in the object region, calculate a confidence score of the object region for the value of the specific structural feature; and
    a unit configured to select a maximum among the confidence scores of the object region at all positions in the object region as the confidence score of the object region for the value of the specific structural feature.

21. The apparatus according to claim 16, further comprising:
    an object region pre-processing unit configured to, for each of the plurality of object regions, pre-process the object region to obtain a partial region in which the final position likely appears in the object region,
    wherein the calculation unit and determination unit operate on the partial region.

22. An apparatus for detecting two eye pupil regions in a face image, the two eye pupil regions having similar radii, the apparatus comprising:
    a setting unit configured to set a selection range for a common initial value of the radii of the two eye pupil regions;
    a calculation unit configured to calculate a confidence score of each of the two eye pupil regions for each value in the selection range;
    a selection unit configured to select a value in the selection range on the basis of the calculated confidence scores of respective eye pupil regions in the two eye pupil regions as the common initial value; and
    a determination unit configured to determine, for each of the two eye pupil regions, a final value for the radius of the eye pupil region and a final center of the eye pupil region separately based on the selected common initial value.

23. The apparatus according to claim 22, further comprising
    a summing unit to sum the calculated confidence scores of respective eye pupil region in the two eye pupil regions,
    wherein the selection unit selects the value in the selection range corresponding to a maximum sum of the calculated confidence scores of respective eye pupil regions in the two eye pupil regions as the common initial value.

24. The apparatus according to claim 23, wherein the selection range is determined based on the distance between the two eye pupil regions.

25. The apparatus according to claim 22, wherein the determination unit comprises:
    a unit configured to set a determination range for the final value of the radii based on the common initial value;
    a unit configured to, for each of the two eye pupil regions, calculate a confidence score for each value in the determination range for the eye pupil region; and
    a unit configured to, for each of the two eye pupil regions, select a value in the determination range which makes the confidence score of the eye pupil region maximum as the final value of the radius of the eye pupil region, and designate a position in the eye pupil region where the confidence score of the eye pupil region is maximum as the final center of the eye pupil region.

26. The apparatus according to claim 22, wherein the calculation unit comprises:
    a unit configured to, at each position in the eye pupil region, calculate a confidence score of the eye pupil region for the value of the radius; and
    a unit configured to select a maximum among the confidence scores of the eye pupil region at all positions in the eye pupil region as the confidence score of the eye pupil region for the value of the radius.

27. The apparatus according to claim 22, further comprising:

a pre-processing unit configured to, for each of the two eye pupil regions, pre-process the eye pupil region to obtain a partial region in which the final center of the eye pupil region likely appears in the eye pupil region, wherein the calculation unit and determination unit operate on the partial region.

28. The apparatus according to claim 27, wherein the pre-processing unit further comprises a unit configured to: for each of the two eye pupil regions, scan the eye pupil region by means of a rectangular sliding window with a predetermined size, and designate an area under the rectangular sliding window in the eye pupil region with a lowest grey intensity as the partial region.

29. The apparatus according to claim 28, wherein the predetermined size is related to the size of the eye pupil region.

* * * * *